(12) United States Patent
Suomela et al.

(10) Patent No.: US 9,423,265 B2
(45) Date of Patent: Aug. 23, 2016

(54) DISPLAYING A MAP HAVING A CLOSE KNOWN LOCATION

(75) Inventors: Riku Suomela, Tampere (FI); Harri Lakkala, Tampere (FI); Ilkka Salminen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1337 days.

(21) Appl. No.: 11/931,755

(22) Filed: Oct. 31, 2007

(65) Prior Publication Data

US 2008/0288165 A1    Nov. 20, 2008

Related U.S. Application Data

(63) Continuation of application No. 10/948,460, filed on Sep. 24, 2004, now Pat. No. 7,480,567.

(51) Int. Cl.
| | |
|---|---|
| *G01C 21/32* | (2006.01) |
| *G01C 21/36* | (2006.01) |
| *G08G 1/0968* | (2006.01) |
| *H04M 1/725* | (2006.01) |

(52) U.S. Cl.
CPC .......... *G01C 21/3641* (2013.01); *G08G 1/0968* (2013.01); *G08G 1/096855* (2013.01); *H04M 1/72572* (2013.01); *Y10S 707/99933* (2013.01)

(58) Field of Classification Search
CPC .......... G01C 21/3641; H04M 1/72572; G08G 1/0968; G08G 1/096855
USPC .......................................................... 701/201
See application file for complete search history.

(56) References Cited

U.S. PATENT DOCUMENTS

| | | | |
|---|---|---|---|
| 4,807,127 A * | 2/1989 | Tenmoku et al. | 701/446 |
| 5,237,323 A | 8/1993 | Saito et al. | |
| 5,528,501 A | 6/1996 | Hanson | |
| 5,594,942 A * | 1/1997 | Antic et al. | 455/423 |
| 5,802,492 A | 9/1998 | DeLorme et al. | |
| 5,905,451 A | 5/1999 | Sakashita | |

(Continued)

FOREIGN PATENT DOCUMENTS

| | | |
|---|---|---|
| EP | 0995973 A2 | 4/2000 |
| EP | 1087323 A1 | 3/2001 |

(Continued)

OTHER PUBLICATIONS

Mäntyjärvi, "Sensor-based context recognition for mobile applications", VTT Publications 511, pp. 1-118, Dec. 18, 2003.

(Continued)

*Primary Examiner* — Tuan C. To
(74) *Attorney, Agent, or Firm* — Ditthavong & Steiner, P.C.

(57) ABSTRACT

A system and method is provided for displaying a map having a close known location and a destination and for providing navigation recommendations for traveling from the close known location to the destination. A user may use a mobile device to submit a request for navigation instructions for navigating from a starting point to a destination. The request may be submitted to a web server, to the mobile device itself, or to another device that can provide navigation instructions. The web server/mobile device or other device determines a recommended route based on the starting point and the destination, and attempts to locate a close known location to the destination near the recommended route. Navigation instructions are provided to the user including directions from the close known location to the destination.

31 Claims, 17 Drawing Sheets

| | | | LOCATIONS VISITED Db | | | |
|---|---|---|---|---|---|---|
| VISITED LOCATION (HOTSPOT) Db. ENTRY | VISITED LOCATION (HOTSPOT) NAME | COUNT (E.G., TIMES VISITED) | FAMILIARITY | NIV | GEOGRAPHICAL COORDINATES | |
| 1 | STORE | 3354 | 1 | | LONG. X, LAT. Y | |
| 2 | PARENT'S HOUSE | 2253 | 1 | | LONG. X, LAT. Y | |
| 3 | UNCLE'S HOUSE | 1987 | 1 | | LONG. X, LAT. Y | |
| 4 | BANK | 1400 | .9 | | LONG. X, LAT. Y | |
| 5 | GAS STATION | 988 | .85 | | LONG. X, LAT. Y | |
| 6 | MUSEUM | 20 | .03 | | LONG. X, LAT. Y | |
| 7 | MOTEL | 8 | .01 | | LONG. X, LAT. Y | |
| 8 | UNKNOWN | | | MIN. | LONG. X, LAT. Y | |
| 9 | UNKNOWN | | | MIN. | LONG. X, LAT. Y | |

(56) References Cited

U.S. PATENT DOCUMENTS

| | | | |
|---|---|---|---|
| 5,937,343 A * | 8/1999 | Leung | 455/403 |
| 6,175,803 B1 * | 1/2001 | Chowanic et al. | 701/209 |
| 6,324,467 B1 | 11/2001 | Machii et al. | |
| 6,452,544 B1 | 9/2002 | Hakala et al. | |
| 6,466,232 B1 | 10/2002 | Newell et al. | |
| 6,477,526 B2 | 11/2002 | Hayashi et al. | |
| 6,498,982 B2 | 12/2002 | Bellesfield et al. | |
| 6,505,118 B2 | 1/2003 | Chowanic et al. | |
| 6,513,046 B1 | 1/2003 | Abbott, III et al. | |
| 6,527,641 B1 | 3/2003 | Sinclair et al. | |
| 6,549,915 B2 | 4/2003 | Abbott, III et al. | |
| 6,633,255 B2 * | 10/2003 | Krasner | G01S 5/0027 342/357.63 |
| 6,633,813 B1 | 10/2003 | Deworetzki | |
| 6,697,734 B1 | 2/2004 | Suomela | |
| 6,741,931 B1 | 5/2004 | Kohut et al. | |
| 6,766,249 B2 * | 7/2004 | Okamoto | G01C 21/3685 701/400 |
| 6,810,329 B2 * | 10/2004 | Koga | G01C 21/3641 340/988 |
| 6,859,728 B2 * | 2/2005 | Sakamoto | G01C 21/36 701/423 |
| 6,915,206 B2 | 7/2005 | Sasajima | |
| 7,092,816 B2 * | 8/2006 | Odinak et al. | 701/202 |
| 7,219,032 B2 * | 5/2007 | Spiesberger | G01S 5/02 702/150 |
| 7,389,179 B2 * | 6/2008 | Jin et al. | 701/207 |
| 7,437,430 B2 * | 10/2008 | Rhoads | 709/219 |
| 7,454,545 B2 * | 11/2008 | Kohno | G01C 21/3641 180/271 |
| 2002/0032518 A1 * | 3/2002 | Okamoto | G01C 21/3641 701/400 |
| 2002/0083025 A1 | 6/2002 | Robarts et al. | |
| 2002/0099499 A1 | 7/2002 | Takayama et al. | |
| 2003/0033080 A1 * | 2/2003 | Monde | G01C 21/3461 701/425 |
| 2003/0054830 A1 | 3/2003 | Williams et al. | |
| 2003/0055558 A1 | 3/2003 | Watanabe et al. | |
| 2003/0195702 A1 * | 10/2003 | Koga | G01C 21/3641 701/420 |
| 2003/0216860 A1 * | 11/2003 | Shitamatsu et al. | 701/211 |
| 2003/0229441 A1 | 12/2003 | Pechatnikov et al. | |
| 2004/0027258 A1 | 2/2004 | Pechatnikov et al. | |
| 2004/0117109 A1 * | 6/2004 | Kodani et al. | 701/200 |
| 2004/0117110 A1 | 6/2004 | Sasajima | |
| 2004/0225433 A1 * | 11/2004 | Burt | 701/200 |
| 2004/0260464 A1 * | 12/2004 | Wong | 701/209 |
| 2005/0004755 A1 * | 1/2005 | Ogura | G01C 21/3641 701/533 |
| 2006/0080029 A1 | 4/2006 | Kodani et al. | |
| 2006/0085123 A1 | 4/2006 | Sugita | |

FOREIGN PATENT DOCUMENTS

| | | |
|---|---|---|
| EP | 1493994 A1 | 1/2005 |
| GB | 2412281 A | 9/2005 |
| WO | WO 03/054654 A2 | 7/2003 |
| WO | WO 03/063521 A2 | 7/2003 |
| WO | 2004076976 A1 | 9/2004 |

OTHER PUBLICATIONS

International Search Report dated Dec. 14, 2005.
Extended European search report for EP application No. 05771413.1-1236 dated Jan. 19, 2011, 1-6.
Supplementary European search report for EP application No. 05771413.1-1236 dated Feb. 7, 2011, 1 page.
Communication pursuant to Article 94(3) EPC for corresponding European Patent Application No. 05 771 413.1-1557, dated Jul. 16, 2015, 4 Pages.

* cited by examiner

| VISITED LOCATION (HOTSPOT) Db. ENTRY | VISITED LOCATION (HOTSPOT) NAME | COUNT (E.G., TIMES VISITED) | FAMILIARITY | NIV | GEOGRAPHICAL COORDINATES |
|---|---|---|---|---|---|
| 1 | STORE | 3354 | 1 | | LONG. X, LAT. Y |
| 2 | PARENT'S HOUSE | 2253 | 1 | | LONG. X, LAT. Y |
| 3 | UNCLE'S HOUSE | 1987 | 1 | | LONG. X, LAT. Y |
| 4 | BANK | 1400 | .9 | | LONG. X, LAT. Y |
| 5 | GAS STATION | 988 | .85 | | LONG. X, LAT. Y |
| 6 | MUSEUM | 20 | .03 | | LONG. X, LAT. Y |
| 7 | MOTEL | 8 | .01 | | LONG. X, LAT. Y |
| 8 | UNKNOWN | | | MIN. | LONG. X, LAT. Y |
| 9 | UNKNOWN | | | MIN. | LONG. X, LAT. Y |

LOCATIONS VISITED Db 500

FIG. 5

| Db ENTRY NO. | NAME | IMAGES | LOCATION |
|---|---|---|---|
| | WELL-KNOWN LOCATIONS Db. | | |
| 10 | HOSPITAL | NORTH.JPG;<br>SOUTH.JPG;<br>EAST.JPG;<br>WEST.JPG | LONG. X LAT. Y |
| 11 | FIRE DEPARTMENT | NORTH.JPG;<br>SOUTH.JPG;<br>EAST.JPG;<br>WEST.JPG | LONG. X LAT. Y |

FIG. 6

DISPLAYING A MAP HAVING A CLOSE KNOWN LOCATION

FIELD OF THE INVENTION

This invention relates generally to mobile devices. More particularly, the present invention relates to a system and method for displaying a map on such a device showing a close known location to a desired destination, and to a system and method for navigating using a close known location.

BACKGROUND OF THE INVENTION

Digital maps and wayfinding systems are interactive navigational aids that provide scalable maps and that recommend navigation paths. Maps used by these systems include a number of objects or symbols to represent well-known locations, such as airports, hospitals, and the like. Many also show a symbol to represent a specific location requested by a user, which may include an endpoint, a start point and significant intermediate points for a route (e.g., intersections along the route). Wayfinding maps often provide navigation instructions via a small-scale map showing a recommended path for a particular journey, as well as optional large-scale turn-by-turn maps showing, in detail, significant intermediate points of the journey.

Wayfinding digital maps that indicate a user's current location are additionally known. These maps may take advantage of global positioning system (GPS) technology to show a user's current location on the digital map. These maps are often used as navigation aids, such as for a person driving an automobile, boat, or airplane. They generally include an indicator showing the user's present location and the direction of travel. These maps may also include common symbols representing the location of airports, hospitals, and the like.

Various improvements on interactive digital maps and wayfinding maps have been proposed. One improvement is disclosed in U.S. Pat. No. 6,697,734 to Riku Suomela, which describes an interactive digital map that displays landmarks and prominent features, and which may display locations known to a user. The digital map has two scales, which includes a detail area having a first scale located in a substantially central portion of the map and an object area having a second scale located in a peripheral portion of the map. Objects are shown in the object area oriented with respect to the detail area. The objects represent geographic locations of interest such as landmarks and other prominent features. The objects may also represent known locations saved by the user on a device that displays the map. The objects are located in a peripheral portion of the map and assist the user with maintaining his orientation as he navigates a route or learns a new location.

Another improvement is discussed in International Patent Application No. PCT/IB02/05522 to Räsänen et al., published as International Publication No. WO 03/054654, which is hereby incorporated by reference. As disclosed therein, location information of a mobile wireless device may be used to determine a Novelty Index Value (NIV) of the mobile wireless device at its present location, which indicates how novel it is for the wireless device to be within a certain geographical area that includes the present location. The NIV may be stored in a database of NIVs and used with context information to compute various results for a user (e.g., recommend dining activities based on user location and the NIV for the location).

In general, conventional interactive maps and wayfinding systems determine a recommended route between a starting point and a destination, and then display the entire route with optional step-by-step directions for the route. The displayed map may include desired intermediate waypoints, landmarks and/or requested points of interest. The directions for the route and the route itself are provided to the user as a serial route from the selected start point to the selected destination based on a recommended path between the start point and destination. Conventional interactive maps and recommended routes can be displayed on a mobile wireless device and may include a user's current location.

SUMMARY OF THE INVENTION

The present invention provides a system and method for displaying a map having a known location that is close to a desired destination and a recommended route, and/or for providing navigation recommendations for traveling from a close known location to the desired destination. Known locations may be locations indicated as being known to the user requesting navigation recommendations. Known locations may also be locations indicated as being commonly known or well-known in their corresponding geographical locations, such as landmarks, famous buildings and places, and prominent structures or geographical features. Close known locations may be known locations that are close to a destination for a requested navigation route.

In one embodiment of the invention, a user may use his mobile device to submit a request for navigation instructions for navigating from a starting point to a destination. The request may be submitted to a web server, to the mobile device itself, or to another device, that provides navigation instructions. The web server/mobile device or other device determines a recommended route based on the selected starting point and the selected destination, and attempts to locate a close known location to the destination and/or near to the recommended route, and may locate a closest known location. Navigation instructions are provided to the user including directions from the close known location to the destination.

In other embodiments, a database is maintained and updated for use in determining known locations, which may be located on the mobile device, at the web server, or at another location. In further embodiments, methods for providing navigation instructions, for determining known locations, and for displaying and interacting with navigation maps are provided. In other embodiments, computer-executable instructions for implementing the disclosed methods are stored on computer-readable media. Other features and advantages of the invention will become apparent with reference to the following detailed description and figures, where like numbers refer to like features.

BRIEF DESCRIPTION OF THE DRAWINGS

The invention will be described in detail in the following description of embodiments with reference to the following figures wherein:

FIG. 5 shows a locations visited database according to an embodiment of the invention for use with the mobile device of FIG. 1 and/or the web server of FIGS. 3 and 4;

FIG. 6 shows a well-known locations database according to an embodiment of the invention for use with the mobile device of FIG. 1 and/or the web server of FIGS. 3 and 4;

DETAILED DESCRIPTION OF THE INVENTION

Figure 1:
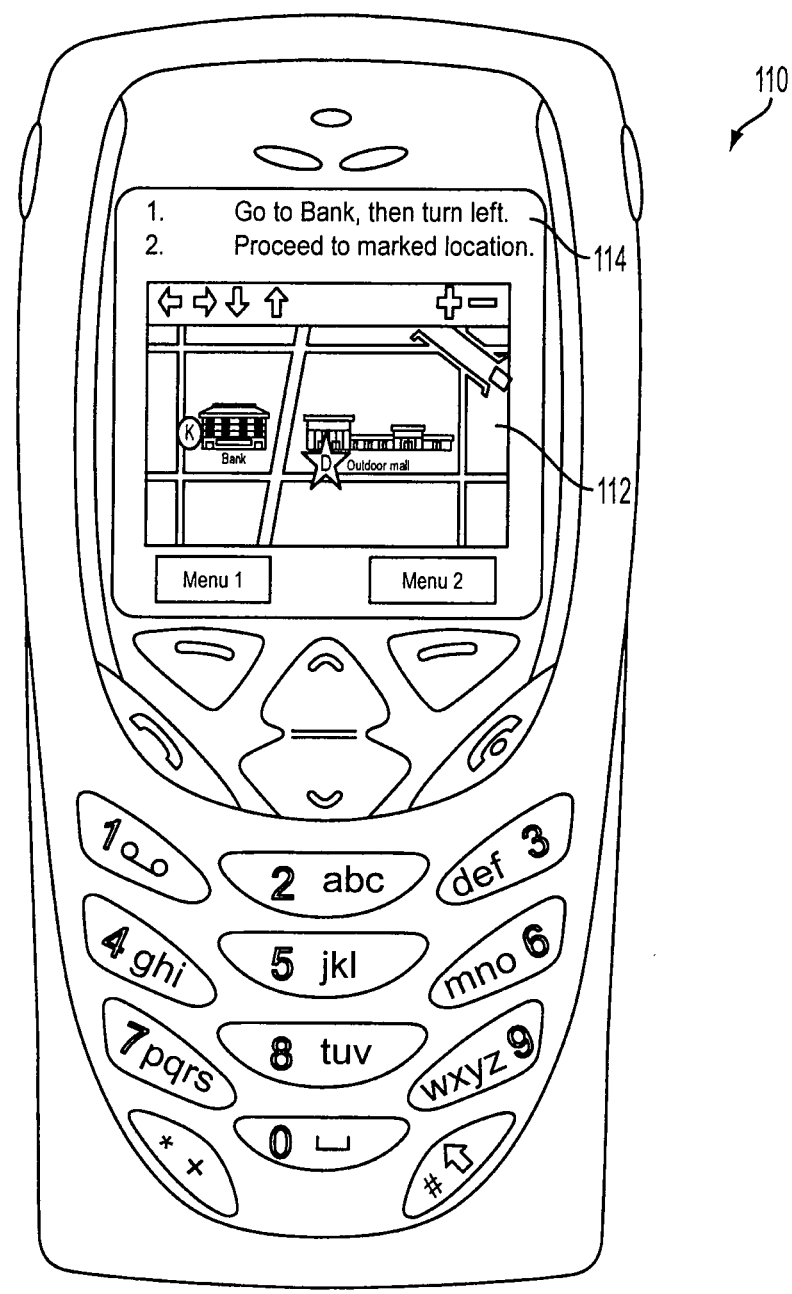
FIG. 1 shows a mobile device that includes a navigation map displayed on the mobile device according to an embodiment of the invention.

The invention may be embodied in various forms. FIG. 1 shows a mobile device 110 displaying a digital map 112 and/or textual navigation instructions 114, which may be a wireless terminal device that can communicate over the Internet with web servers.

The digital map 112 and navigation instructions 114 provide a user with directions to a desired destination from a location known to the user rather than from the starting point selected by the user. This permits navigational instructions to be simplified by omitting extraneous portions of a recommended route that includes a location known by the user that is positioned close the destination known, or that includes a well-known location that is easily locatable by the user, such as prominent landmark (i.e., by omitting instructions for traveling from the starting point to the close known location). It may also simplify navigation by providing the user with a recommended route that includes a familiar location or an easily identifiable location. Although the recommended route may not be the most direct route from the selected starting point to the destination, the route may easily be understood by the user due to the known location and may reduce the likelihood of becoming lost.

"Starting point" as used herein may include a user's current location or a starting point selected by the user that may be different than the user's current location. "Known locations" as used herein may include locations that are identified as being known to a particular user, and commonly known or well-known locations for a corresponding geographical location, such as landmarks, prominent or famous structures and locations, and prominent geographical features. However, as used herein, "known location" excludes the user's current location, which ordinarily would constitute a starting point for navigation instructions. It also excludes the user's requested starting point, which may differ from the user's current location.

Graphical navigation instructions using a close known location can be displayed with greater detail compared with a display of an entire recommended route. This is because a map displayed to the user may be focused on a portion of the map with which the user may be unfamiliar (i.e., the portion from the close known location to the destination) and may omit familiar portions of the route (i.e., the portion from the starting point to the close known location). The map may therefore be scaled to show the end portion of the route in a greater detail than could otherwise be shown without requiring the user to zoom in and out along the recommended route. Reducing the size of the display map and improving its scale can be particularly advantageous when displayed on a mobile terminal device or other computing device having a relatively small display screen.

Mobile device 110 may comprise a network-enabled wireless device, such as a digital camera, a cellular phone, a mobile terminal, a data terminal, a pager, a laptop computer or combinations thereof, which can access Internet applications such as those hosted on wayfinding websites. Wayfinding websites generally refer to websites that provide navigation recommendations for finding your way between a starting point and a destination. The mobile device may also comprise a device that is not network-enabled, such as a personal digital assistant (PDA), a wristwatch, a GPS receiver, a portable navigation device, a car navigation device, a portable TV device, a portable video device, a portable audio device, or combinations thereof. Such non network-enabled devices may include RFID tag readers. Further, the mobile device may comprise any combination of network-enabled wireless devices and non network-enabled devices. Although device 110 is shown as a mobile device, it is understood that the invention may be practiced using non-portable or non-movable devices. As shown in the example network diagram of FIG. 3 as a network-enabled device, mobile device 310 may communicate over a radio link with radio tower 316, which is connected to wireless network 318 in communication with WAP protocol gateway 320. The gateway 320 is connected over the Network 322 to web servers, such as wayfinder web server 324. Wireless network 318 may be a third-generation (3G) cellular data communications network, a Global System for Mobile communications network (GSM), a WLAN network, or other wireless communication network. Mobile device 310 may also communicate with web server 324 via one or more ports on the mobile device that may allow a wired connection to the Internet, such as universal serial bus (USB) connection (not shown) to a networked computer, and/or via a short-range wireless connection (not shown), such as a BLUETOOTH link or a wireless connection to WLAN access point. Thus, mobile device 310 may be able to communicate with web server 324 in multiple ways. Mobile device 310 may use the Wireless Application Protocol (WAP), the I-mode protocol, the mobile IPv6 protocol, or other protocols for transmitting web-based data and applications over its wireless connection. It may also include applications that use the Wireless Markup Language (WML), the Hypertext Markup Language (XML), the Extensible Markup Language, or other web content languages.

Figure 2:
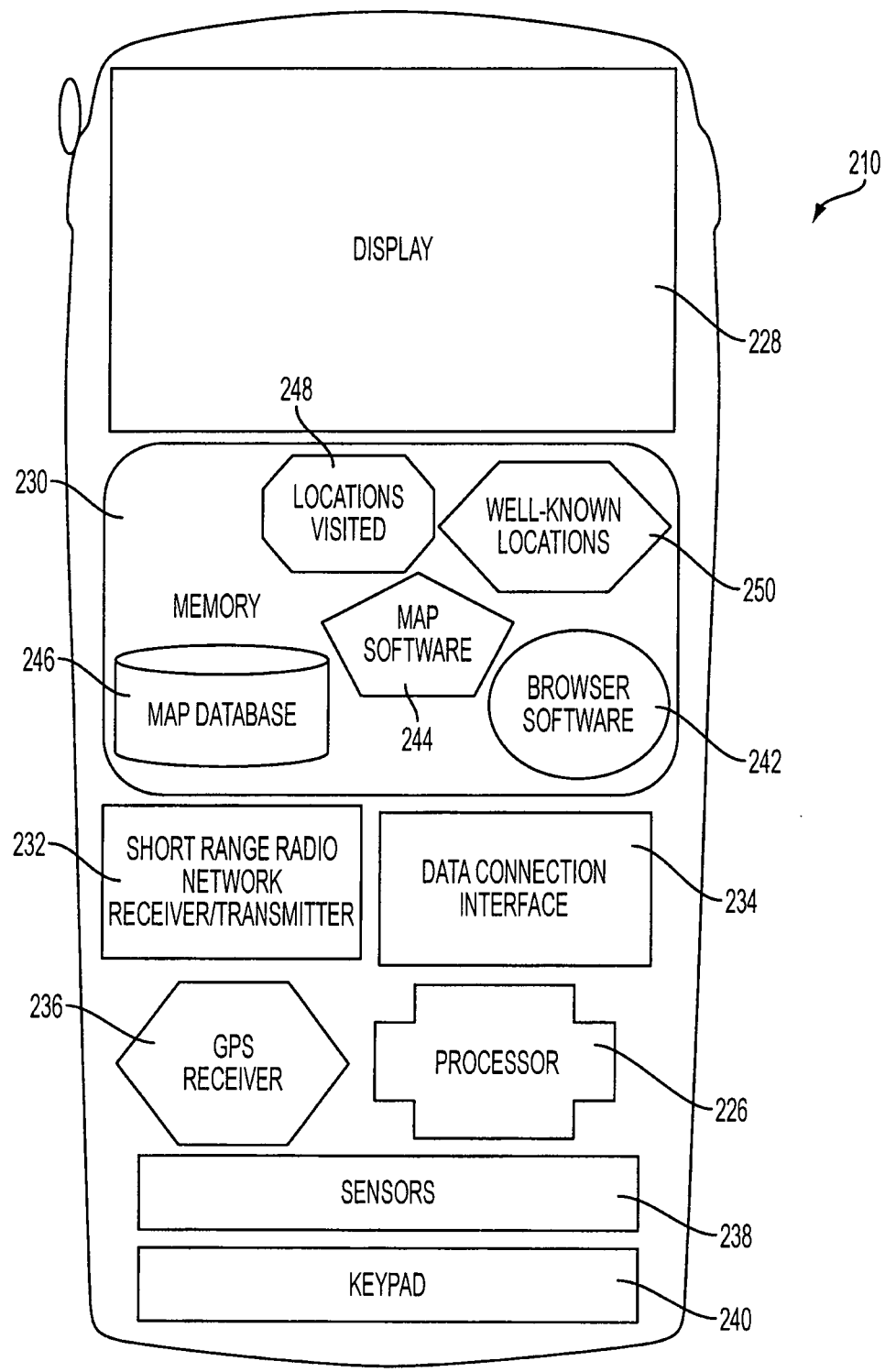
FIG. 2 is a functional diagram of the mobile device of FIG. 1.

As shown in FIG. 2, mobile device 210 may include a processor 226, a display 228, memory 230, a data connection interface 234, and a keypad 240. It may also include a short-range radio transmitter/receiver 232, a global positioning system (GPS) receiver 236 and sensors 238. The processor 226 is in communication with memory 230 and performs instructions stored therein. The processor 226 is connected to display 228 and generates a display thereon, such as map 112 and textual navigation instructions 114 shown in FIG. 1. The keypad 240 is also in communication with the processor 226 for providing inputs to the processor. In combination, the keypad 240, display 228 and processor 226, in concert with instructions stored in memory 230, generally form a graphical user interface (GUI), which allows a user to interact with the device and modify displays shown on display 228. Data connection interface 234 is connected to processor 226 and enables communication with wireless network 218 via radio communication with radio tower 216 or other data connections.

Short-range radio transmitter/receiver 232 is connected to processor 226 and enables communication via short-range radio communications, such as communications via a BLUETOOTH link or communications with radio frequency identification (RFID) tags. GPS receiver 236 receives GPS transmissions (not shown) and communicates with processor 226 to enable the processor to determine current location information for mobile device 210. Mobile device 210 may also take advantage of other positioning mechanisms, such as positioning methods based on communication signals between the mobile device and base stations (e.g., triangulation methods) and proximity based methods (e.g., communication with a BLUETOOTH proximity sensor). Sensors may include accelerometers, a camera, a thermometer, a microphone, a compass, etc. that can provide context information for the mobile device. For instance, accelerometers or a compass within mobile device 210 may provide information in concert with GPS receiver 236 to assist with providing real-time map updates to the user based on user movements along a route. Overall, mobile device 210 is generally a mobile computing device, such as a handheld personal computer, a mobile communication device, and a mobile terminal, that may include a variety of internal components, communication hardware and software, attachments, and the like.

In accordance with instructions in memory 230, the processor performs steps for displaying digital map 112 on display 228. The digital map 112 may be generated and a recommended route may be determined in a variety of ways. As illustrated in the network diagram of FIG. 3 together with mobile device 110/210, web browser software 242 stored in memory 230 may provide instructions to display map 112 based on data transmitted from web server 324. Alternatively, map software 244 shown in FIG. 2 may be used to generate digital map 112 based on the data transmitted from server 324. Also, map software 244 stored locally in memory 230, such as a wayfinding program resident on mobile device 210, may generate navigation map 112 and provide navigation instructions without interacting with web server 324 by referring to data stored in map database 246 of the mobile device, locations visited database 248, and/or in well-known locations database 250. Other methods may also be used, such as maintaining locations visited database 248 on the mobile device, but relying upon data from server 324 to provide map data and a recommended route between a start point and a destination.

Figure 3:
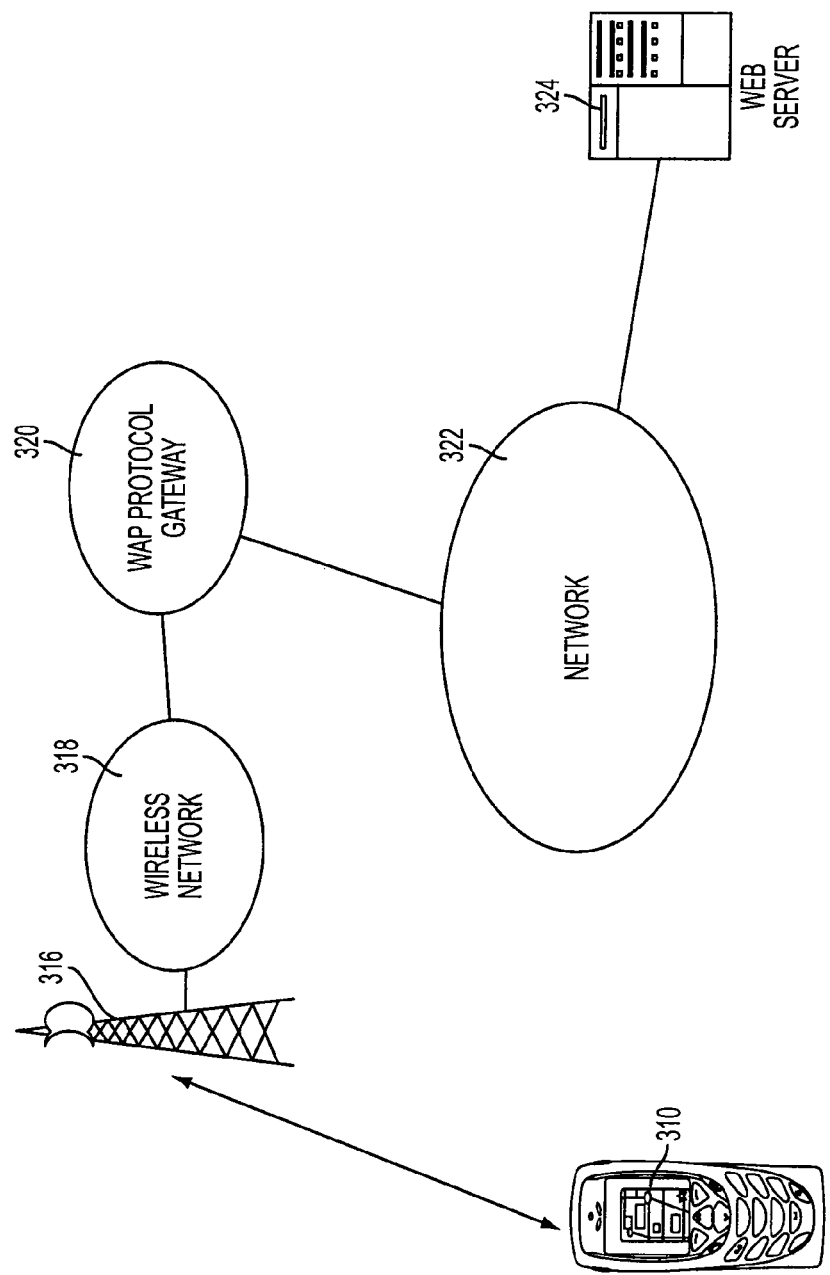
FIG. 3 is a network diagram according to an embodiment of the invention showing a relationship between a wayfinder service web server and the mobile device of FIG. 1.
Figure 4:
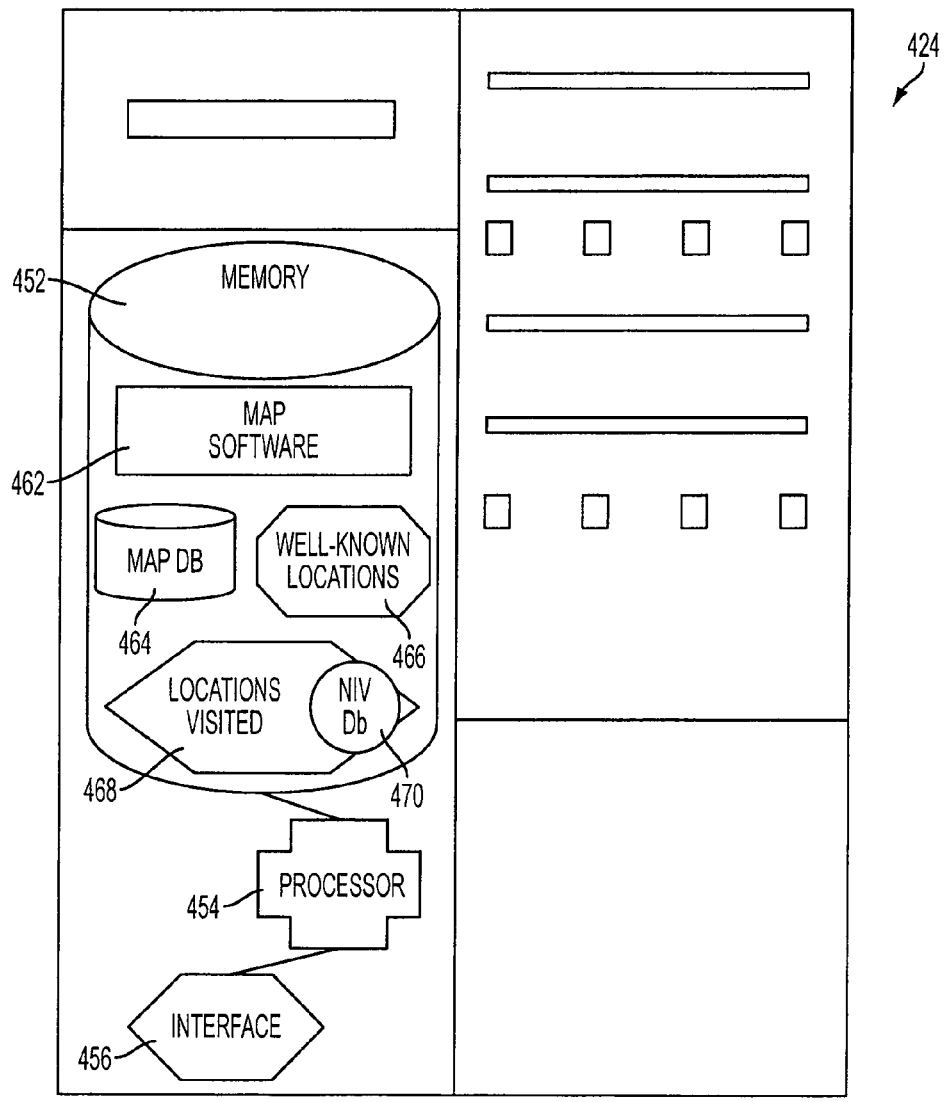
FIG. 4 is a functional diagram according to an embodiment of the invention for the web server of FIG. 3.

As shown in the network diagram of FIG. 3, web server 324 hosts a web site, such as a wayfinder website, that provides navigation recommendations for navigating from a starting point to a destination. As shown in FIG. 4, web server 424 may include memory 452, a processor 454 and a network interface 456. Network interface 456 permits the server to send and receive data transmissions over network 322, which may include the Internet or other networks. Memory 452 includes instructions for instructing processor 454 to perform actions, such as generating map data and sending data via network 322 to computing devices, such as mobile device 310. Memory 452 may include a wayfinder program 462, a map database 464, a well-known locations database 466, and a locations visited database 468, which may include a Novelty Index Value (NIV) database 470. Based on data received from mobile device 310, wayfinder program 462 may enable server 424 to determine recommended navigation routes and to generate associated map data for sending to mobile device 310. As discussed below together with FIG. 7, wayfinder program 462 may refer to well-known locations database 466 to provide navigation routes based on landmarks and other locations that are commonly known, and to locations visited database 468 to provide navigation routes based on locations that are known to a user or that are determined to likely be known by the user. Alternatively, the locations visited database may be stored locally on mobile device 310 and known location data stored thereon may be sent from mobile device 310 to server 324 along with a request for navigation recommendations. In addition, all of the above-described programs, databases, components and steps may be located and/or occur in a single device.

Referring now to FIG. 5, a locations visited database 500 is shown that stores information about locations 502 visited by mobile device 310, and/or by individual users. Locations visited database 500 may be specific to mobile device 310 and may be stored in mobile device 310, at web server 324, or at another accessible location. In addition, locations visited database 500 may be specific to a user who may share equipment or may use multiple devices, rather than being specific to the device. Locations visited database 500 may also be stored at an Internet-accessible location, such as a web server, and may be updated and accessed based on identification of the user via a login procedure or other identification method. The contents of database 500, except perhaps for the contents of count 510, may be received or downloaded from an external database or server. The received information may also include a description (not shown) for every location.

Locations visited database 500 may also include a visited location name 504, geographical coordinates 506 of listed locations, a familiarity value 508, and a count 510 of the number of times the location has been visited by the mobile device 310 and/or the registered user. The geographical coordinates 506 may be determined in various ways including via GPS coordinates, triangulation methods and proximity sensors. The familiarity value 508 for each location may be calculated using an algorithm that takes into account several factors, such as visits per month to the location, total number of visits to the location, the period of time since the previous visit, etc. Whether a location listed in database 500 is deemed to be "known" to a particular user or the use of a mobile device for purposes of wayfinding may depend on the familiarity value. For example, the familiarity value may be determined by assigning a value of 1 to a location visited more than once within a ten-day period and decreasing the value by 0.1 every ten-day period that occurs without a subsequent visit. A familiarity value of 0.5 or greater may be required to consider a location as "known" to the user for navigation purposes. Locations manually added or identified by the user as "known" may always be deemed to be "known," and may have a permanent familiarity entered as "1." Also, as discussed below, locations having a certain Novelty Index Value (NIV) may be deemed to be "known." In general, frequently visited locations will have a higher familiarity value and/or a lower NIV, and will likely be treated as known locations.

Locations visited database 500 (which may be saved as database 248 on mobile device 210 or database 468 on web server 424) may include a Novelty Index Value (NIV) database (not shown), and/or NIVs 504 for corresponding geographical areas. NIVs 504 indicate how novel it is for a wireless device to occupy a particular geographical area (not shown), such as the area within a grid 0.1 km by 0.1 km. NIV values, NIV databases, and methods for updating the NIV database and determining NIV values are disclosed in International Patent Application No. PCT/IB02/05522 to Rasanen et al., published as International Publication No. WO 03/054654, which is hereby incorporated by reference. A NIV 504 may indicate that it is novel for a wireless device to be within a certain geographical area (e.g., a particular grid square) that includes a specific location, such as a store having specific coordinates, without indicating how novel it is for the wireless device to be at the specific coordinates of the location. For instance, FIG. 5 indicates that database entries 8 and 9 include geographical areas that are frequently visit by mobile device 310, which are not novel to the wireless device and therefore have a minimum NIV. A low NIV may indicate it is not novel for the mobile device to be within the geographical location, and a high NIV may indicate the opposite.

Locations visited database 500 may regularly be updated based on context information from mobile device 310, and may be updated on a relatively constant basis as the location of mobile device 310 changes. For example, locations that the user visits may automatically be tagged with names 504 and stored in database 500 using location data for mobile device 310. Geographical coordinates 506 and corresponding names 504 may be determined via mobile device 310 monitoring its GPS coordinates and comparing them with information stored in the mobile device. Matches between the GPS coordinates and locations in map database 246 may automatically be entered into locations visited database 500 based on instructions from map software 244. Also, historical location information for mobile device 310 may be collected and stored in memory 230 of the mobile device, which may be periodically sent to web server 324. Web server 324 can subsequently compare the location information with data in map database 464 to determine locations visited by the mobile device and/or the user, and then update locations visited database 500 accordingly. In addition, a service provider (not shown) for mobile device 310 may monitor the location of the mobile device via GPS information or other location information to determine location matches with its own database of locations. Locations visited information may be sent by the mobile service provider to mobile device 310 to update database 246 if stored thereon, or to web server 424 to update database 468 if stored thereon.

The user of mobile device 310 may also tag locations and, if desired, may enter names for the locations visited into database 500. For instance, the user may select a "tag location" soft key (not shown) on keypad 240, which may add the present user location into database 500 by adding current geographical coordinates 506 to the database, and/or by prompting the user to enter a location name 504. The user may be able to edit database 500 to remove undesired entries or to block recordation of visits to specific locations. The user may also create personal interest points in database 500 to monitor visits to these points. The user may also identify personal interest points or other desired points as "known locations" regardless of the frequency at which the locations are visited, which may be recorded as having a NIV of "min" or a familiarity value of "1." As discussed previously, database 500 may be stored locally on mobile device 210 as database 246, and/or at web server 424 as database 468. Dual copies of the database may exist at different locations, which may periodically be synchronized. User modifications for database 500 may be performed via map software 244 for information stored locally in database 248, and via web browser 242 for interacting with web server 424 with respect to information stored in database 468.

Location visited information may be shared between mobile device 310 and web server 324 as necessary, particularly if dual versions of database 500 exist that need to be synchronized. Further, data stored in locations visited database 500 may be shared between various mobile devices and users, if desired. This can be helpful for users who share common knowledge of locations within a geographical area—particularly if one of the users has a relatively empty database 500 that she would like to populate. Locations visited information may be shared via web connectivity, direct connections between the mobile devices, communications with web server 424, or in other ways.

In addition, locations visited database 500 may regularly be updated via RFID tags or BLUETOOTH transmitters encountered by mobile device 310, which may be used in various locations to inform mobile device 310 and database 500 that the user is at a specific location, building or area. The RFID tags or BLUETOOTH transmitters may provide name and description information for the target location, such as coordinates, and database 500 may accumulate hits to increase its count 510 for each location. Database 500 may include a filter (not shown) to restrict accumulation of certain kinds of locations, buildings or areas. Without the filter, database 500 may collect many irrelevant locations, buildings or areas, such as small shops and stores that could clutter the wayfinding system. Filtering undesirable location entries may limit database 500 to more significant location entries, such as public buildings (e.g., government buildings, museums, theaters, parks, national monuments, etc.) and large stores, which are likely to make to good navigation reference points. The filter may include an interest profile to permit the user to indicate desirable and/or undesirable types of locations, building or areas. For instance, the user profile may indicate that all gas stations and stores are desirable locations, and that restaurants are undesirable locations to be entered into Locations Visited Database 500.

Similar to locations visited database 500, well-known locations database 620 illustrated in FIG. 6 stores information about locations usable for references in providing navigation instructions. However, locations listed in database 620 may be common or well-known locations that are known and/or readily identifiable by most people in a corresponding geographical area. For instance, landmarks, prominent geographical features, famous structures, etc. may be included in database 620. If these locations are not readily identifiable or personally known by the user of mobile device 310, they are at least likely to become known to the user and may provide easy-to-remember reference points by which the user can learn to navigate a new location. As with locations visited database 500, well-known locations database 620 may be saved locally on mobile device 210 as database 250, and/or on web server 424 as database 466, depending on the type of device and/or method for providing navigation instructions. The well-known locations database 620 may be, for example, an electronic tourist guide.

As shown in FIG. 6, well-known locations database 620 includes location data identifying the geographical location 622 of the entry and a name 624. Optionally, database 620 may include images 626 from one or more viewable directions for each respective location. The images of the location may be displayed to the user as additional information to aid in locating the desired destination. If a well-known location from database 620 is used with navigation directions provided to a user of mobile device 110, in addition to textual navigation instructions 114 or map 112, the display may also show an image of the destination from an angle that the user probably will reach the destination, or may include an option to view the image. In addition, images of known or visited locations captured by the user may be included in locations visited database 500, which may be displayed to the user as additional information to aid in locating the known location.

Database 620 may be provided to mobile device 310 or uploaded to web server 424 from a third party service provider. For instance, if the user is in a city that he has never visited before, a service provider can provide a database of well-known locations that are, for example, well visible from a distance and are thus easy to find, or that may be well-known sightseeing locations. As an example, the third party provider may be a travel book publisher or a travel agency.

Figure 7:
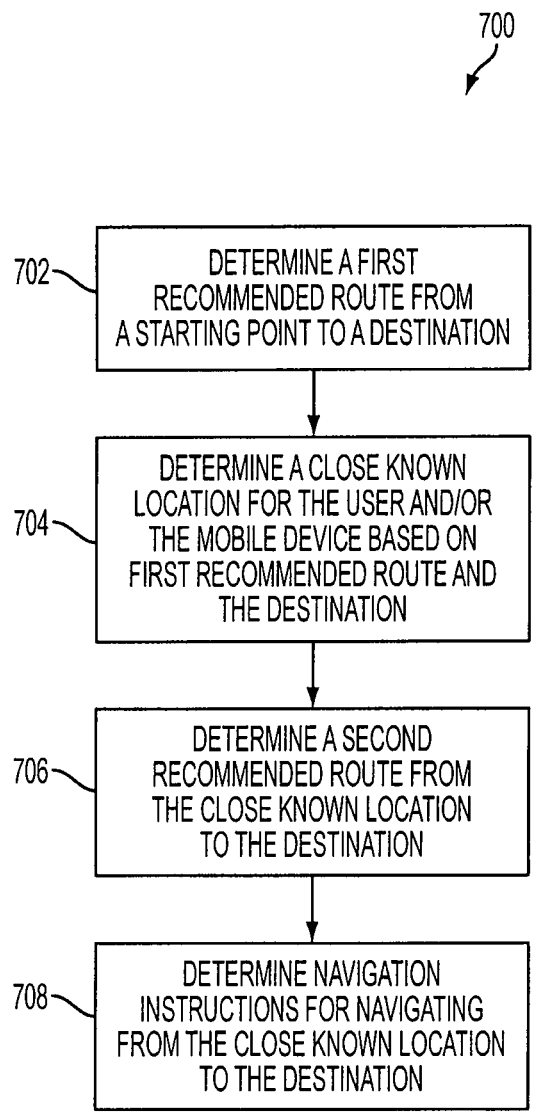
FIG. 7 shows a method for determining navigation instructions according to an embodiment of the invention, which may be used with the mobile device of FIG. 1 and/or the web server of FIG. 3.

FIG. 7 illustrates a method 700 for determining navigation instructions, which may include providing textual navigation instructions 114 and/or interactive map 112 displayed on mobile device 110. Method 700 may be performed by mobile device 210 or by web server 424 in accordance with instructions stored respectively in map software 244 and map software 462. As illustrated in FIG. 7, the map software contains instructions for determining 702 a first recommended route from a starting point to a destination. The first recommended route may be determined from the starting point and destination via known wayfinding methods. For example, the map database may identify geographical nodes, links between neighboring nodes, distance information for the links, and/or parameters for the links, such as approximate travel speeds along the links and type of roadway for the link (e.g., an interstate) for a geographical area. The map software may match the starting point and the destination with location nodes stored in the map database and, using an algorithm such as Dijkstra's shortest path algorithm, calculate a shortest path from the starting point node via intermediate nodes to the destination node. Other known wayfinding methods may be used, such as methods that evaluate the fastest route, the shortest route using highways, and the shortest route using local roads between the starting point and the destination.

Method 700 also includes the step 704 of determining a close known location for the user and/or the mobile device. Known locations may be locations indicated as being known to the user in locations visited database 500, or may be locations indicated as being commonly known or well-known in the corresponding geographical area as indicated in well-known locations database 620. Close known locations may be known locations for a user and/or geographical area that are close to a recommended path and a corresponding destination within an acceptance parameter. The acceptance parameter may be a pre-established parameter used for evaluating whether close known locations are acceptable for the requested navigation. The acceptance parameter may include a maximum acceptable distance for the known location from the destination. It may also be a parameter that was previously set by the user or sent with the request for navigation instructions, such as an acceptable estimated travel time for traveling from the known location to the destination. It may also be a parameter determined in another manner, such as via an algorithm that considers the terrain and density for the requested route or evaluates how far out of the way the known location is from a shortest distance route between the start point and the destination. If any acceptable known locations are not available, the closest known location may be used.

The step of determining a close known location for the user and/or the mobile device may occur via the map software searching for locations stored in locations visited database 500 and/or well-known locations database 620 that are indicated as being known to the user (e.g., having a familiarity value greater than 0.5), which are close to the destination and/or the first recommended route (e.g., a node along a path determined using Dijkstra's shortest path algorithm) within an optional acceptance parameter. If a known location is found meeting the acceptance parameter for a close known location, then step 706 may be performed to determine a second recommended route from the close known location to the destination. This may be performed in a manner similar to step 702, such as by applying Dijkstra's shortest path algorithm to nodes and link data between the close known location and the destination. Once the second recommended route is determined, navigation instructions for navigating from the close known location to the destination may be determined 708 by matching the second recommended route to travel instruction data stored in map database 246/464 that is associated with the nodes and links of the second recommended route. A navigation map may also be generated by selecting a portion of a graphical map stored in the map database that includes the nodes and links of the second recommended route plus a perimeter area. Graphical navigation instructions may also be provided, such as highlighting the recommended route on the navigation map. The graphical navigation instructions may also be provided for a route from a starting point to the destination via the closest known location.

Figure 8:
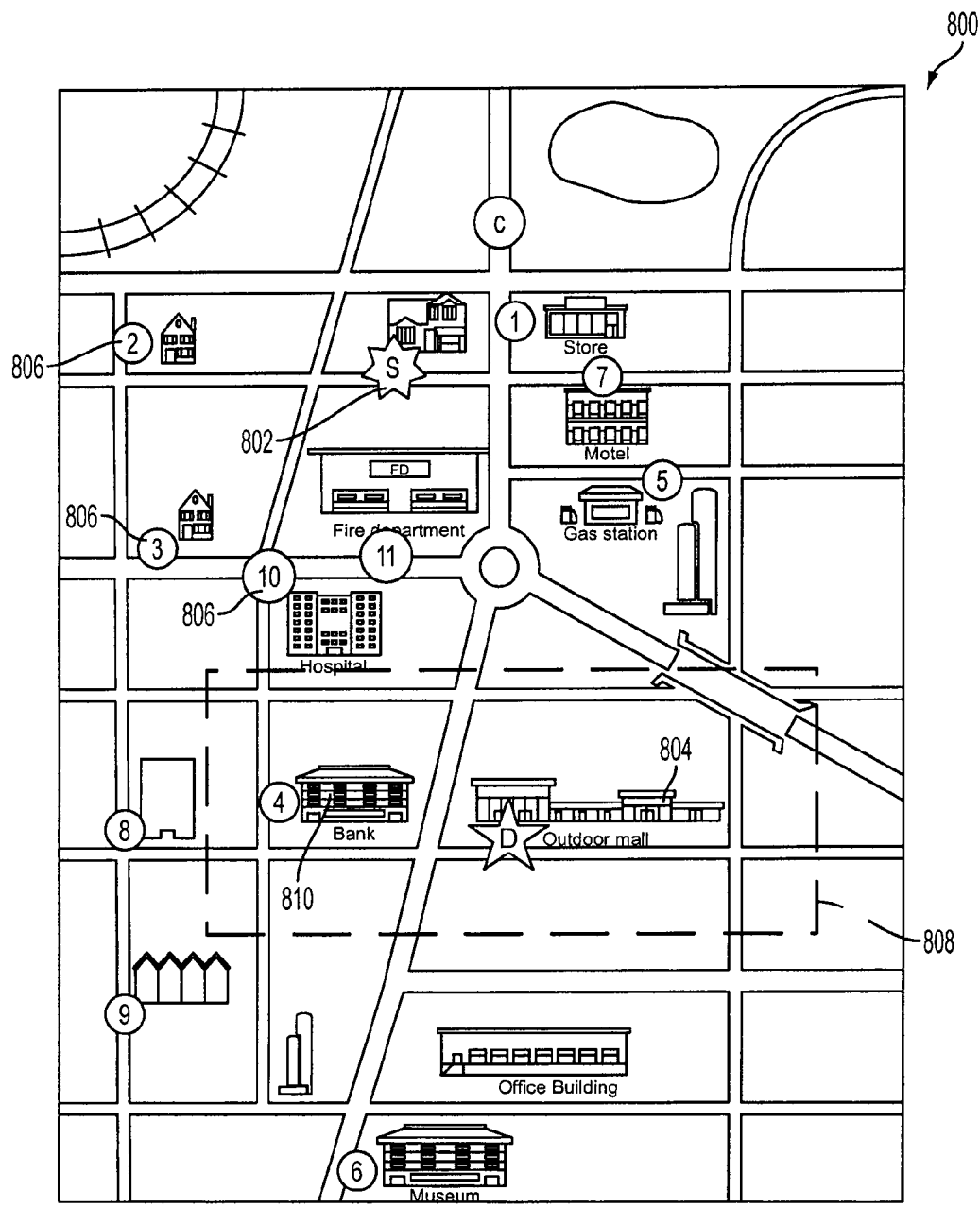
FIG. 8 shows a map for discussion purposes that illustrates example map data stored in a database, example locations visited by a user, and example well-known locations.
Figure 9:
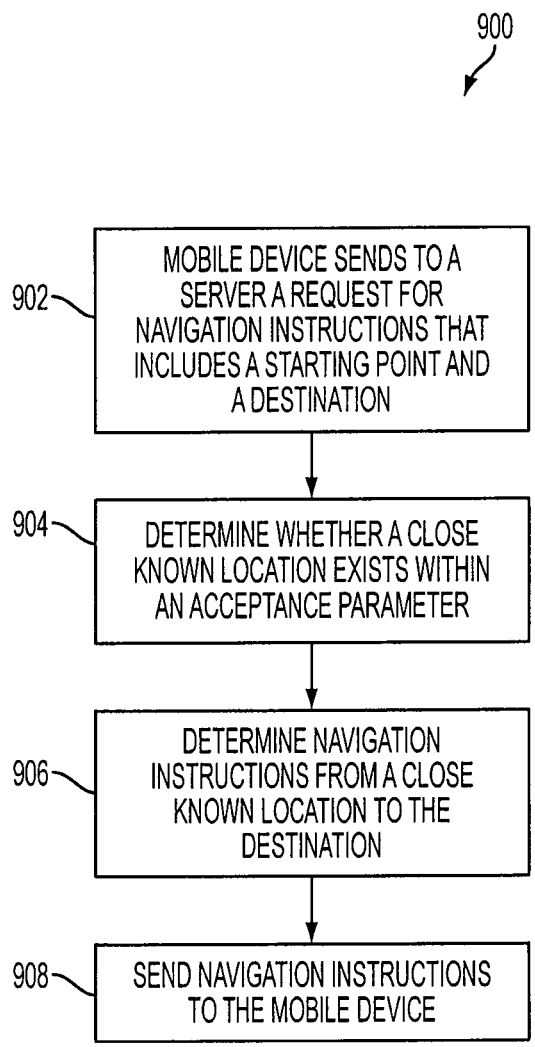
FIG. 9 shows a method for determining and providing navigation information to a user according to an embodiment of the invention.
Figure 10:
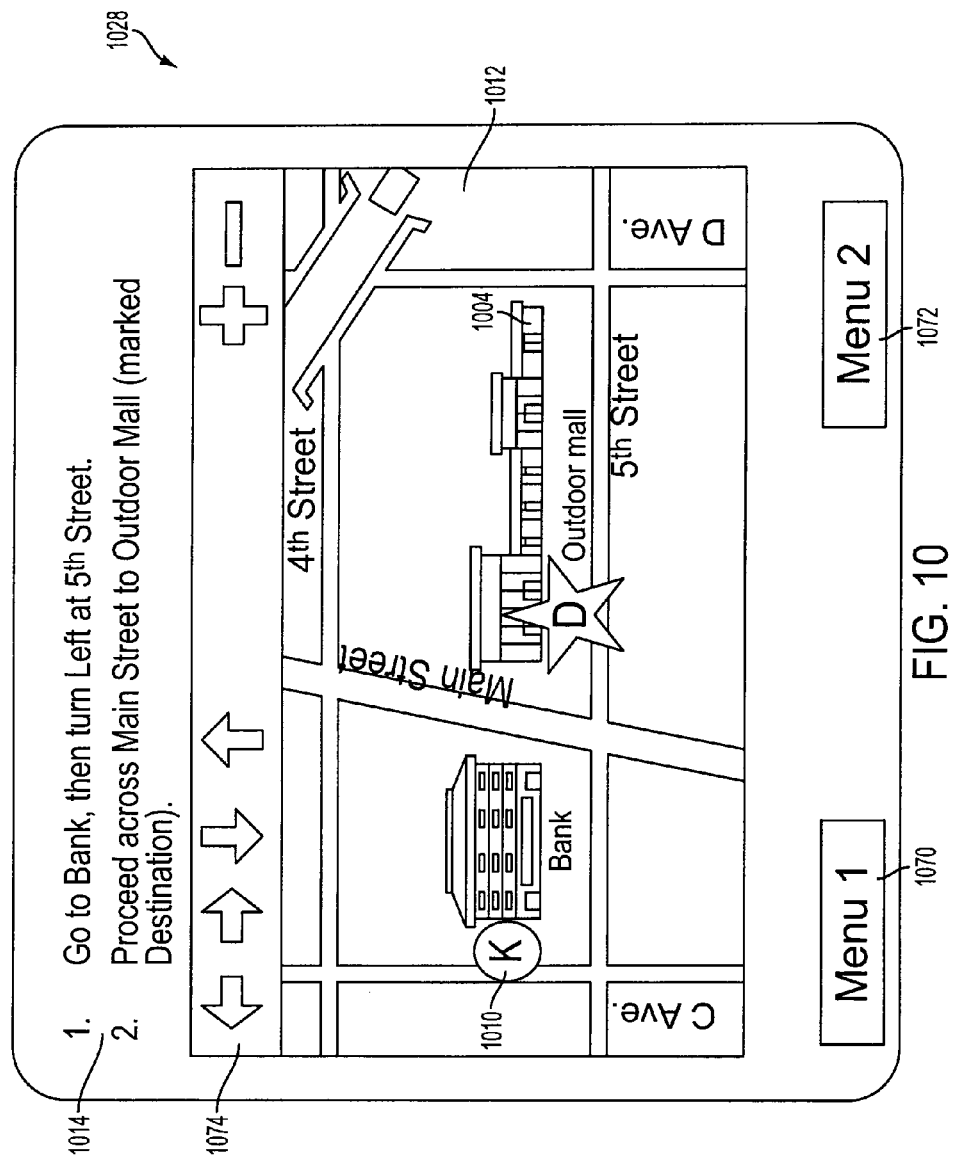
FIG. 10 is a close view of the display of the mobile device of FIG. 1.

Referring now to FIGS. 8-10 along with network diagram 310 of FIG. 3, a graphical representation 800 is shown in FIG. 8 of map data that may be stored in map database 246/464, locations visited database 500 and/or well-known locations database 620, which is used for discussion purposes herein for discussing a method 900 of FIG. 9. Method 900 is a method for determining and providing to a user navigation information that includes a known location. FIG. 10 shows a sample display 1028 that may be provided to a user via method 900. Suppose as an example that a user desires navigation instructions for traveling within a city from a starting point 802 designated by an "S" symbol on shown on map 800 of FIG. 8, to an Outdoor Mall 804 designated by a "D" symbol on the same map. Locations 806 designated as points 1-7 and 10 on map 800 are example locations previously visited as indicated in the locations visited database 500, and points 8 and 9 are locations that are well-known for the respective geographical area as indicated in the well-known locations database 620. Suppose further that the user desires navigation instructions for traveling from starting point 802 to destination 804, and therefore enters such a request into the mobile device.

As shown in FIG. 9, based on the information entered by the user, the mobile device sends 902 a request for navigation instructions for navigating from starting point 802 to destination 804, which may include data that identifies the user to the web server (e.g., a username and password) and/or identifies the mobile device (e.g., a cookie), and suppose that known locations information for the user and well-known locations information for the geographical area are stored at a web server. Upon receipt of the request, the web server evaluates corresponding data in map database 464, locations visited database 468 for the identified user, and well-known locations database 466 for the corresponding geographical location. Based thereon, the web server can determine 904 whether a close known location to the requested destination 804 exists within an acceptance parameter, and may select a closest known location from the available known locations.

If the web server locates a close known location that meets the acceptance parameter (e.g., bank 810 shown in FIG. 8 and item no. 4 in locations visited database 500), it determines 906 navigation instructions for traveling from the close known location to destination 804. At this point, the web server may simply send 908 the determined navigation instructions to the mobile device as text data without map data, which may be displayed to the user as text. This could be a user-selected option, or it could be an automatically selected option if bandwidth/connectivity limitations and/or graphics limitations on the mobile device make it impractical to send or display map data. Also, the web server may proceed to generate navigation map data by determining a map boundary 808 corresponding to the determined navigation instructions. Alternatively, the web server may send 908 the determined navigation instructions along with map data, and the mobile device may determine map boundary 808 based on the data sent in accordance with local display limitations on the device or other considerations, such as processing limitations.

Map boundary 808 may be established based on an algorithm, such as a calculation to determine the navigation map area that includes the destination 804 and the determined close known location 810, as well as a perimeter factor, such as 120%, by which the calculated area is multiplied to determine the overall navigation map area. The determined navigation instructions may be sent from the web server to the mobile device along with the map data located within map boundary 808, and the location information for the determined close known location 810. In the present example, map data within map boundary 808, close known location 810, destination 804, and navigation instructions for traveling from bank 810 to mall 804 would be sent to the mobile device. As shown in FIG. 10, the mobile device subsequently displays digital map 1012 and navigation instructions 1014 on display 1028, which may include menus 1070 and 1072 or menu options (not shown), as well as interactive navigation selectors 1074 that permit the user to zoom and pan the interactive map.

In the above-described scenario, bank 810 stored in locations visited database 500 and shown on map 800 was determined to be the closest known location to destination 804. As such, navigation instructions from bank 810 to mall 804 were determined along with map boundary 808, which is about 20% larger than the map area that includes bank 810 and mall 804. As shown in FIG. 10, this information is provided to the user as an interactive map 1012 that includes a representation of the closest known location 1010 and a representation of the destination 1004, as well as textual navigation instructions 1014. As such, the user can quickly understand the location of destination 1004 in relation to a point the user knows (e.g., bank 1010), as well as quickly understand how to navigate to destination 1004 based on the user's understanding of where bank 1010 is located.

Although the initial request for navigation instructions from the user included a request for a route from starting point 802 shown in FIG. 8 to destination 804, the user only needed instructions for the unfamiliar portion of the route (i.e., directions for traveling from the bank to the mall). Conventional navigation instructions for the requested route, which would have included a series of maneuvers along various roads, would have been more difficult for the user to understand quickly. This is particularly true for the relatively small display 1028 of the mobile device. The digital map and navigation instructions shown in FIG. 10 provide the user with directions from a known location close to the desired destination rather than the entire route, which reduces the amount of navigation information to be displayed compared with conventional wayfinding systems and displays. This can improve the viewability of navigation information provided to the user by permitting the scale of the displayed map to be enlarged, and by improving user comprehension of the recommended instructions based on recognizing a familiar location.

Figure 11:
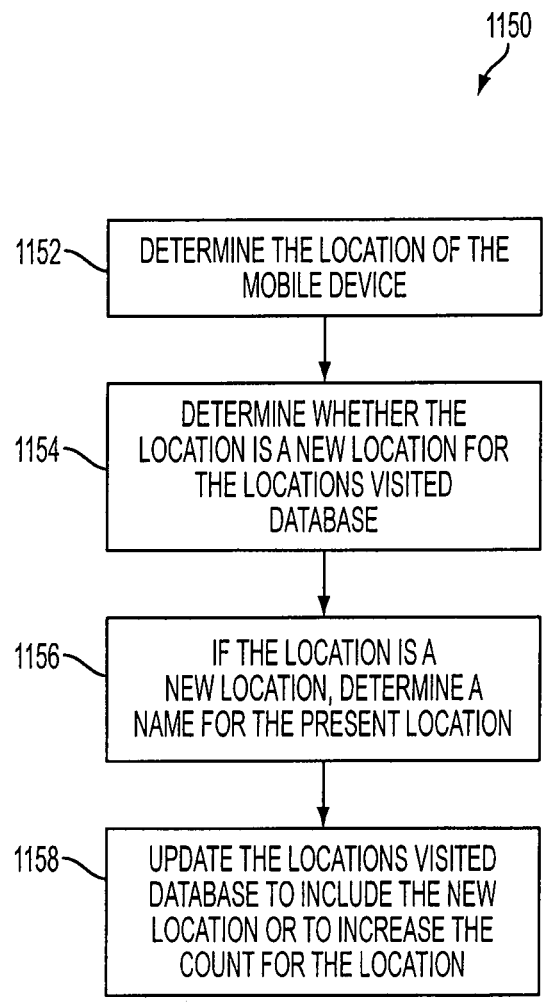
FIG. 11 shows a method for updating the locations visited database of FIG. 5 according to an embodiment of the invention.

FIG. 11 illustrates a method 1150 for updating a locations visited database 500. Suppose that the mobile device can monitor its present location via a GPS receiver or via other methods, such as triangulation methods. As such, according to method 1150, the mobile device may be able to evaluate 1152 its current location, and subsequently determine 1154 whether the current location is a new location. If it is a new location, in step 1156 a name for the present location may automatically be determined. The name may be determined automatically in various ways, such as by comparing the present location with location information for identified locations, such as locations in a map database, by receiving name information entered by a user of mobile device 210, or by receiving name information from a BLUETOOTH transmitter or an RFID tag proximate the current location. The locations visited database 500 may subsequently be updated 1158 to include the new information or to increase the count if the current location is listed in the database.

Figure 12:
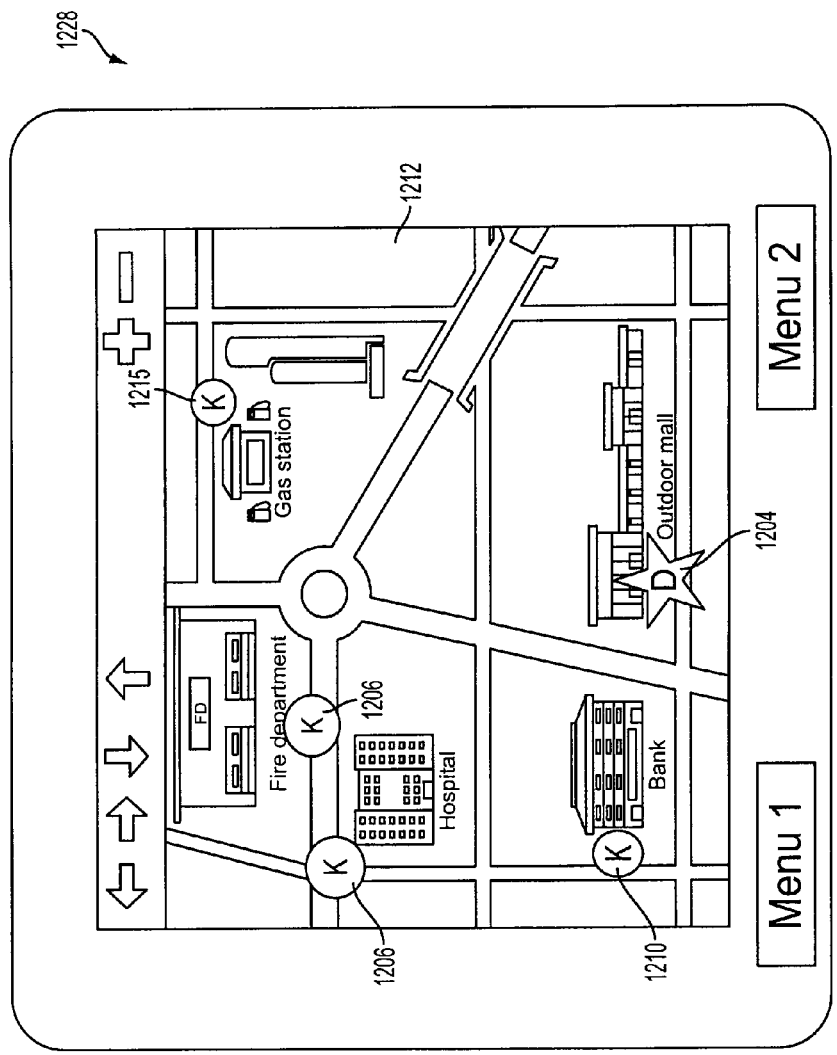
FIG. 12 is a close view of the display of the mobile device of FIG. 1 according to another embodiment of the invention.

FIGS. 12-17 illustrate navigation instructions that may be displayed on a mobile device. FIG. 12 shows digital map 1212 displaying multiple close known locations from which the user may select for determining navigation instructions therefrom. Digital map 1212 is a zoomed out view from the digital map 1012 of FIG. 10, which shows additional close known locations 1206 beyond closest known location 1210. Digital map 1212 may be provided after the user of the mobile device selects the zoom out selector from navigation selectors 1074 shown in FIG. 10. Alternatively, digital map 1212 may be generated via map boundary 808 shown in FIG. 8 automatically being selected to include multiple known locations 806 near the closest known location 810 within a certain parameter, such as within a given distance or an estimated travel time from closest known location 810. This can provide a user with multiple close known locations from which to choose a single known location for a basis in determining navigation instructions. For instance, the user of the mobile device may choose to receive navigation instructions from close known location 1215 identified as "gas station" in FIG. 12 rather than from closest known location 1210 identified as "bank." If the user selects alternate close known location 1215, a new display having navigation instructions from alternate close known location will be provided, such as map 1512 and navigation instructions 1514 shown in FIG. 15.

Figure 13:
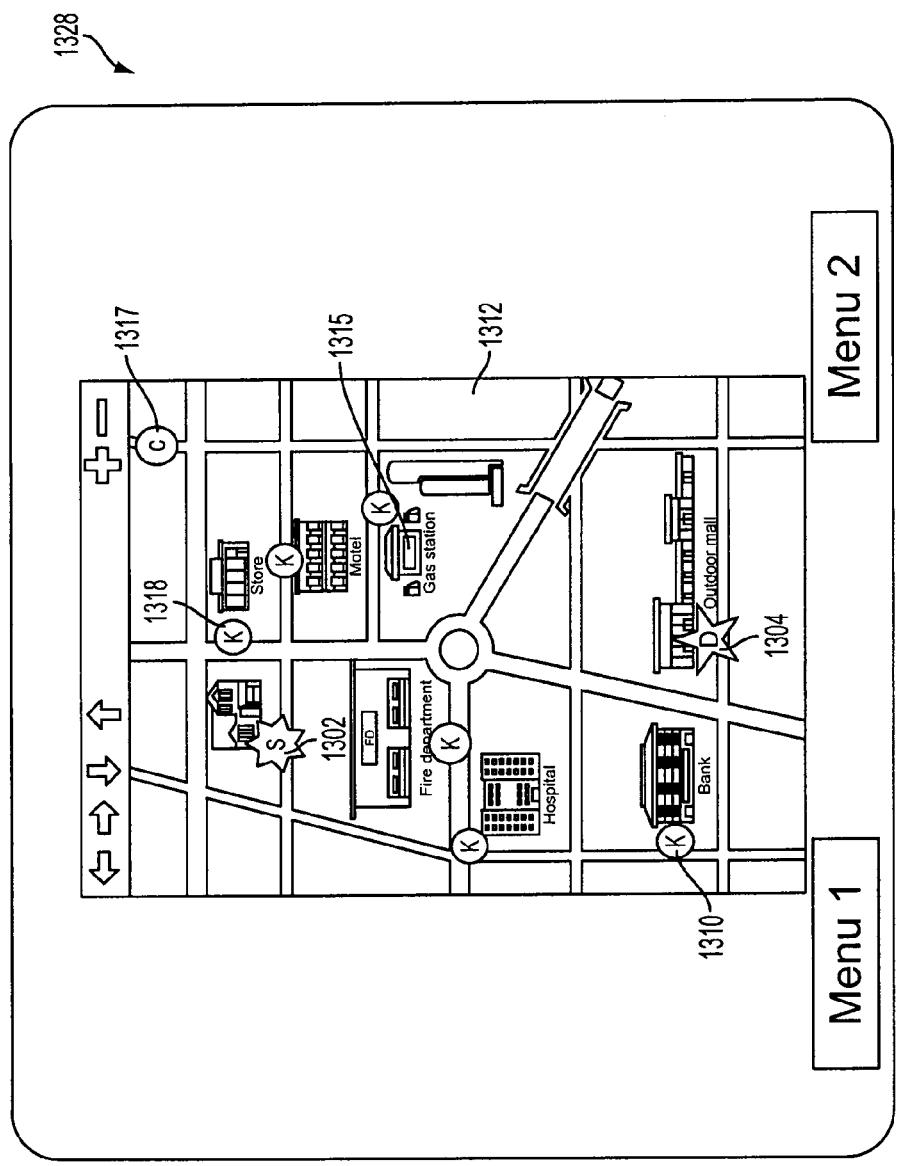
FIG. 13 is a close view of the display of the mobile device of FIG. 1 according to a further embodiment of the invention.

FIG. 13 shows a digital map 1312 that has been reduced in scale to include the user's current location 1317 along with the closest known location 1310 and the destination 1304. It also includes start point 1302 to illustrate that the start point may differ from the user's current location 1317. However, the user's current location may be the start point for navigation purposes. Also, the user's current location may be set up as the default start point absent contrary instructions from the user. As with FIG. 12, the user may select from the known locations shown to receive navigation instructions from a desired known location. For instance, if the user selects known location 1318 from display 13, the display 1428 of FIG. 14 may be provided.

Figure 14:
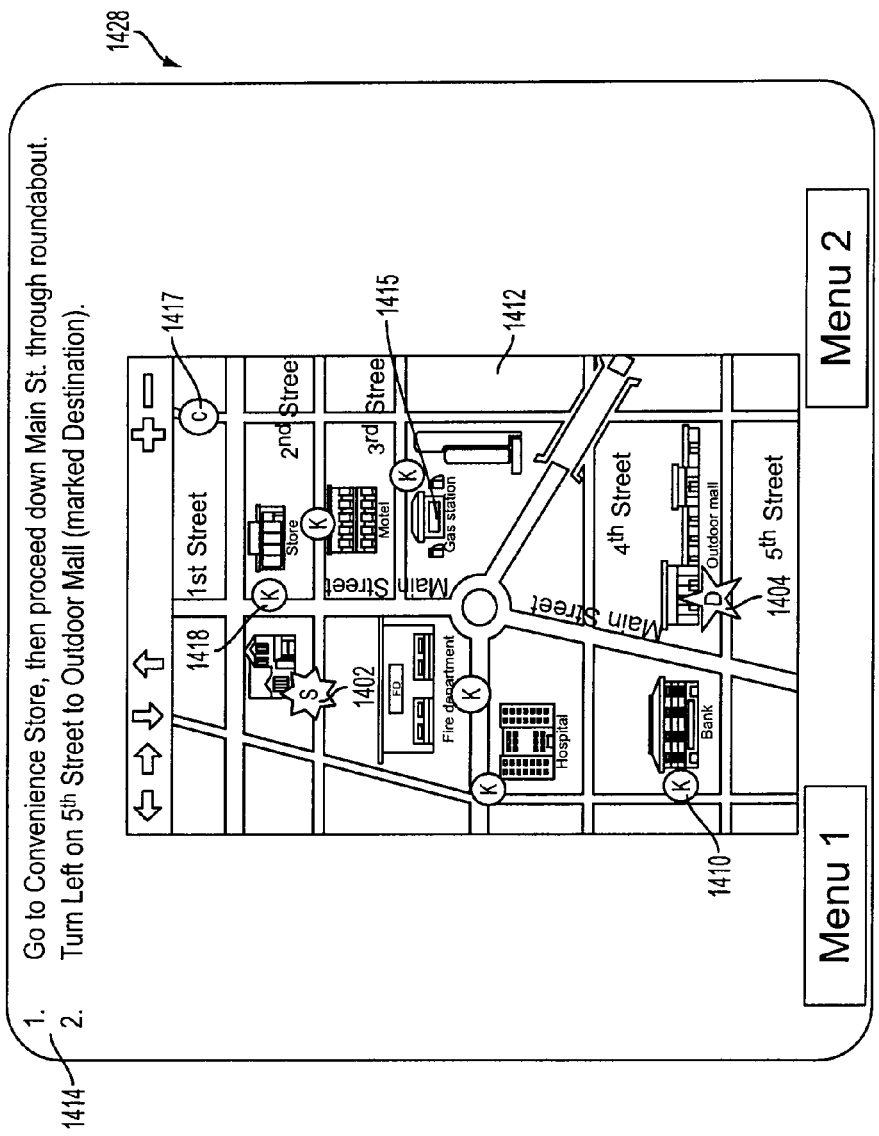
FIG. 14 is a close view of the display of the mobile device of FIG. 1 according to yet another embodiment of the invention.

FIG. 14 is similar to FIG. 13 except that it includes street names and navigation instructions 1414 to guide the user from current location 1417 to destination 1404 based on navigation instructions from the closest en route location 1418 positioned along a recommended route from the user's current location 1417 to destination 1404. The closest en route location 1418 is selected by determining a recommended route from the user's current location 1417 to destination 1404 and by finding a known location close to the user's current location and the recommended route, and which may be located along the recommended route. For instance, suppose a recommended route from the user's current location 1417 to destination 1404 includes proceeding from $1^{st}$ Street to Main Street to $5^{th}$ Street. As such, known location 1418 labeled as "Store" is the closest known location positioned near (and in this case along) the recommended route of $1^{st}$ Street to Main Street to $5^{th}$ Street. Other known locations may be closer to the user's current location 414, which may not be shown on the map, but known location 1418 may be selected because it is close to the user's current location 1417 and is close to or along the recommend route from user's current location 1417 to destination 1404.

Figure 15:
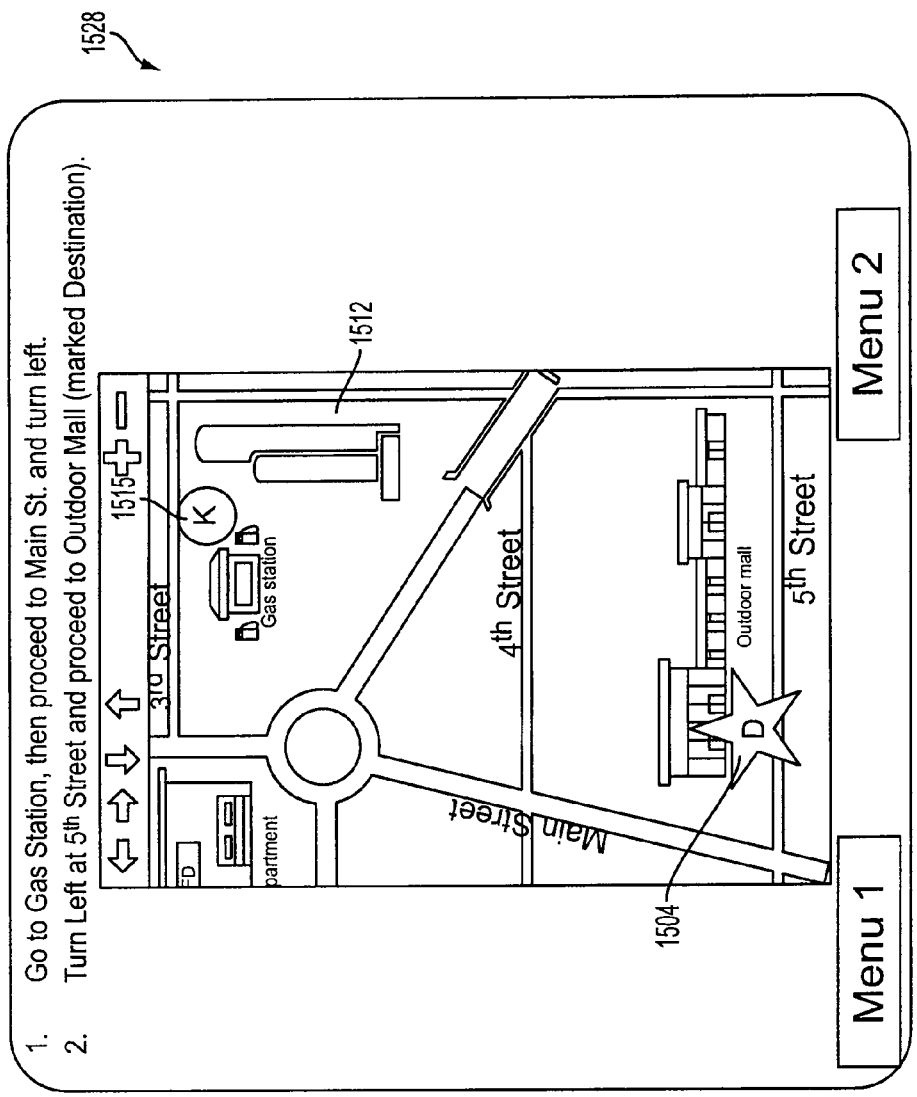
FIG. 15 is a close view of the display of the mobile device of FIG. 1 according to an additional embodiment of the invention.

If the user desires directions from another known location, such as known location 1414, he may select known location 1415, which would result in updated navigation instructions being provided as shown in FIG. 15. If the user's current location is known, FIG. 14 may represent an option for providing navigation instructions when the closest en route known location 1418 is within an acceptable parameter from destination 1404, such as within a given distance. If the closest en route location is too far from the destination, more detailed and complex navigation instructions will need to be provided from the known location to the destination. However, it may be advantageous to direct the user to the closest en route known location to prevent the user from becoming lost. Subsequent directions from the closest en route location may be determined once the user is properly oriented, which may be based on a closer known location.

Figure 16:
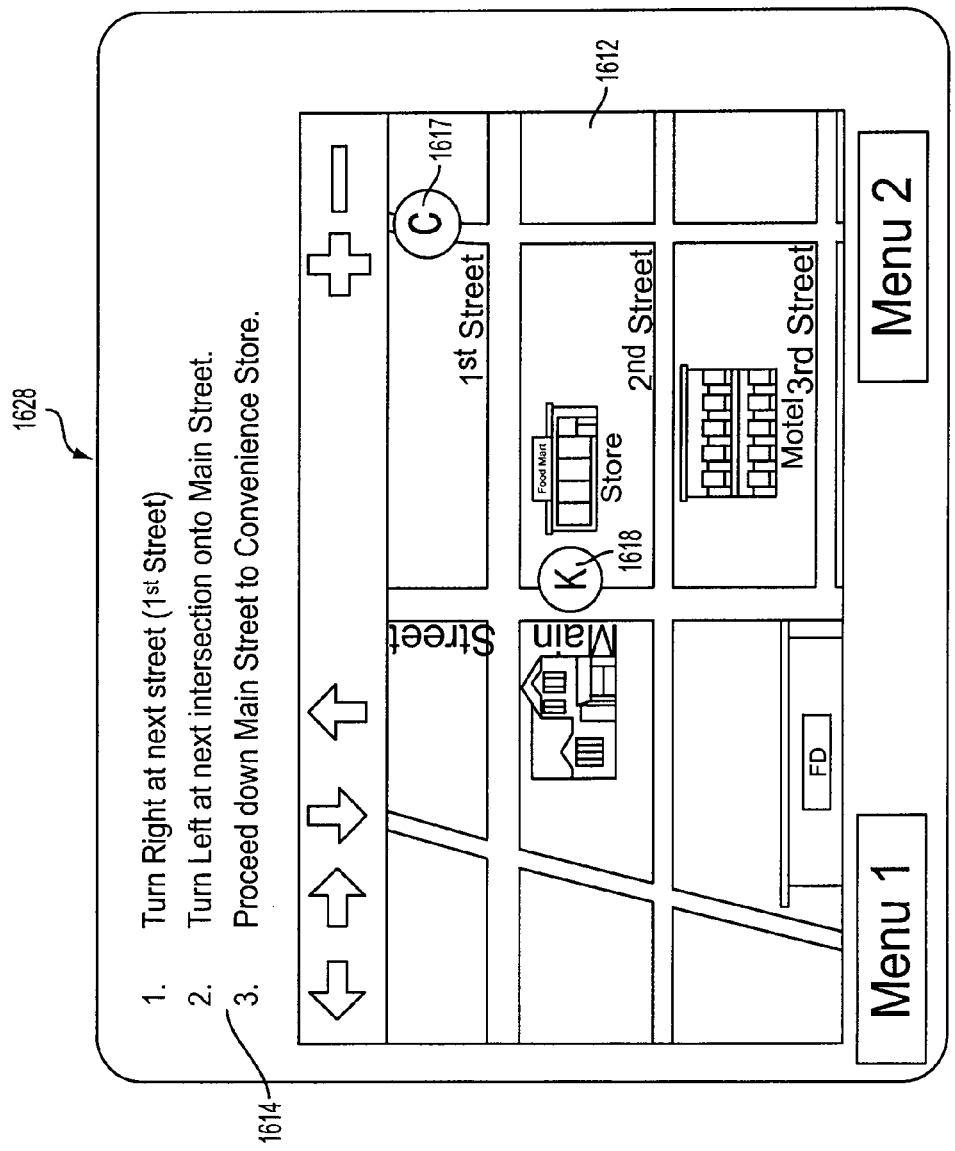
FIG. 16 is a close view of the display of the mobile device of FIG. 1 according to another embodiment of the invention.

In the event a user is completely lost and would simply like to find a familiar location, navigation instructions like those shown in FIG. 16 may be provided. Display 1628 of FIG. 16 includes navigation instructions to the known location nearest to the user's current location 1617, assuming the user's location is known via GPS data or other location methods. As such, display map 1612 is scaled to show the user's present location along with the nearest known location 1618 near current location 1617. Nearest known location 1618 in this instance is determined based simply on its proximity to the user's current location 1617, rather than with regard to any recommended routes to a destination. Navigation instructions 1614 are also provided for directing the user to nearest known location 1618.

FIG. 16 may also represent a situation in which real-time instructions or near real-time instructions are provided using real-time location data for the mobile device. For instance, current location 1617 on display 1612 may move at or near real-time along with user movements, and navigation instructions 1614 may change as the user accomplishes each step of the route. This may be an option for further assisting the user with desired navigation that can be used in various scenarios. For instance, once the user's current location is within the map area shown in FIG. 10, the displayed map 1012 could change to a real-time or a near real-time map (e.g., periodically updated) that tracks the user's movements from closest known location 1010 to destination 1004.

Figure 17:
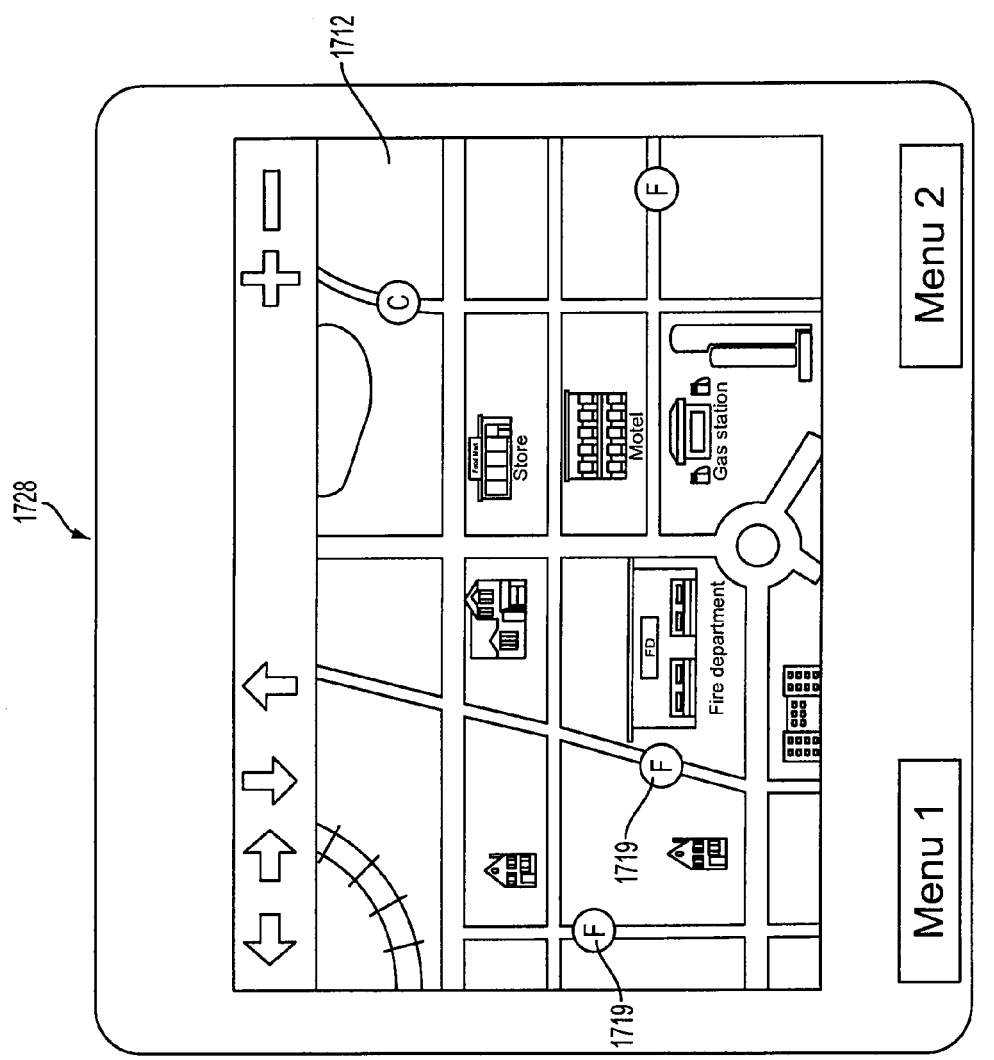
FIG. 17 is a close view of the display of the mobile device of FIG. 1 according to yet a further embodiment of the invention.

FIG. 17 illustrates an option in which displayed known locations may include the current locations 1719 of other mobile devices, such as those of friends or relatives. If desired, other known locations could be shown in the map display 1712 along with the other devices, which can permit the user to locate a friend via a route from a known location. Showing locations of other mobile devices may also permit a group of people to track each other to assist in determining and meeting at a convenient location for the group. The users in the group may exchange their current locations directly with each other via a networked proxy (not shown) or other communication methods.

While the present invention has been described in connection with the illustrated embodiments, it will appreciated and understood that modifications may be made without departing from the true spirit and scope of the invention. In particular, the invention applies to any computing device adapted to display a digital map and/or provide wayfinding services.

We claim:

1. An apparatus comprising:
    at least one processor; and
    at least one memory including computer program code for one or more programs,
    the at least one memory and the computer program code configured to, with the at least one processor, cause the apparatus to perform at least the following,
    receive a request for navigation instructions for navigating to a destination;
    determine a path to the destination;
    evaluate, whether a location that is within a predetermined distance from the path is a known location to a requester that makes the request, using one or more probability values indicating user knowledge of the location, wherein the one or more probability values includes a novelty index value or a familiarity value of the location; and
    cause, at least in part, sending navigation information to the requester at a current location, wherein the navigation information includes instructions for navigating from the known location to the destination, and the known location is different from the current location.

2. The apparatus of claim 1, wherein the novelty index value indicates a relative novelty of a geographical area that includes the location.

3. The apparatus of claim 1, wherein the request is received from a mobile device and the apparatus is further caused to:
    select the location from a database of locations based on an acceptance parameter,
    wherein the navigation information sent to the requester includes the instructions for navigating from the known location to the destination while excluding instructions for navigating from the current location to the known location.

4. The apparatus of claim 3, wherein the acceptance parameter comprises a first distance between the location and the destination, a second distance between the location and a point in the path closest to the location, and an acceptable estimated travel for traveling time for traveling from the location to the destination.

5. The apparatus of claim 1, wherein the navigation instructions comprise a navigation map showing the known location and an image of the destination from an angle that the user probably will reach the destination.

6. The apparatus of claim 5, wherein the navigation map comprises a plurality of known locations, and the apparatus is further caused to:
    receive a user selection of a second known location from the plurality of known locations; and
    cause, at least in part, sending second navigation instructions to the requester for navigating from the second known location to the destination.

7. The apparatus of claim 6, wherein the second navigation instructions includes second textual instructions for navigating from the second known location to the destination and a second navigation map showing the second known location and the destination.

8. The apparatus of claim 1, wherein the request requests for navigation instructions from a starting point to the destination, and the starting point comprises a current location for a device sending the request.

9. The apparatus of claim 1, wherein the request requests for navigation instructions from a starting point to the destination, and the starting point comprises a starting location selected by the requester.

10. The apparatus of claim 1, wherein the evaluating includes a terrain parameter between the location and the destination.

11. the apparatus of claim 1, wherein the familiarity value is calculated based, at least in part, on one or more visits per month to the location, a total number of visits to the location, a period of time since a previous visit, or a combination thereof.

12. An apparatus comprising:
at least one processor; and
at least one memory including computer program code for one or more programs,
the at least one memory and the computer program code configured to, with the at least one processor, cause the apparatus to perform at least the following,
receive a request for navigation instructions for navigating from a starting point to a destination;
determine a path from the starting point to the destination;
select a known location from a database of known locations, wherein the known location is different from the starting point;
determine navigation instructions for navigating from the known location to the destination;
cause, at least in part, sending navigation information to a requester at the starting point providing instructions for navigating from the known location to the destination;
receive information identifying the present location of the requester; and
update a visit count for an entry in a location visited database for the present location.

13. The apparatus of claim 12, wherein the request is received from a mobile device and the apparatus is further caused to:
select the known location from a database of known locations based on an acceptance parameter.

14. The apparatus of claim 13, wherein the acceptance parameter comprises a first distance between the known location and the destination, and a second distance between the known location and a point in the path closest to the known location.

15. The apparatus of claim 12, wherein the navigation instructions comprise a navigation map showing the known location and the destination.

16. The apparatus of claim 15, wherein the navigation map comprises a plurality of known locations, and the apparatus is further caused to:
receive a user selection of a second known location from the plurality of known locations; and
cause, at least in part, sending second navigation instructions to the requester for navigating from the second known location to the destination.

17. The apparatus of claim 16, wherein the second navigation instructions include second textual instructions for navigating from the second known location to the destination and a second navigation map showing the second known location and the destination.

18. The apparatus of claim 12, wherein the request requests for navigation instructions from a starting point to the destination, and the starting point comprises a current location for a device sending the request.

19. The apparatus of claim 12, wherein the request requests for navigation instructions from a starting point to the destination, and the starting point comprises a starting location selected by the requester.

20. A method comprising:
receiving, by a processor, a request for navigation instructions for navigating to a destination;
determining, by the processor, a path to the destination;
evaluating, by the processor, whether a location that is within a predetermined distance from the path is a known location to a requester that makes the request, using one or more probability values indicating user knowledge of the location, wherein the one or more probability values includes a novelty index value or a familiarity value of the location; and
causing, at least in part by the processor, sending navigation information to the requester at a current location, wherein the navigation information includes instructions for navigating from the known location to the destination, and the known location is different from the current location.

21. The method of claim 20, wherein determining a path to the destination includes determining a path from a starting point to the destination, the starting point and the known location being different.

22. The method of claim 20, wherein the novelty index value indicates a relative novelty of a geographical area that includes the location.

23. A method comprising facilitating access to at least one interface configured to allow access to at least one service, the at least one service configured to perform at least the following:
receiving a request for navigation instructions for navigating to a destination;
determining a path to the destination;
selecting a location that is within a predetermined distance from the path from one or more databases including a database of known locations;
evaluating whether the selected location is known to a requester that makes the request, using one or more probability values indicating user knowledge of the location, wherein the one or more probability values includes a novelty index value or a familiarity value of the location;
determining navigation instructions for navigating from the known location to the destination; and
causing, at least in part, sending to the requester at a current location the navigation instructions, wherein the known location is different from the current location.

24. The method of claim 23, wherein the navigation instructions are sent to a mobile terminal.

25. The method of claim 23, wherein the known location is selected from the database based on an acceptance parameter.

26. The method of claim 25, wherein the acceptance parameter comprises a first distance between the known location and the destination, and a second distance between the known location and a point in a path between a starting point and the destination closest to the known location.

27. The method of claim 25, wherein the database is located at a location of a service provider providing the at least one service.

28. The method of claim 25, wherein the database is located remote from a location of a service provider providing the at least one service.

29. The method of claim 25, wherein the database is located at a mobile terminal.

30. The method of claim 23, wherein the novelty index value indicates a relative novelty of a geographical area that includes the location.

31. The method of claim 23, wherein the one or more databases include a location visited database, wherein the present location of a mobile terminal is determined and the location visited database is updated based on the determined present location.

* * * * *